US010189565B2

(12) United States Patent
Patterson et al.

(10) Patent No.: US 10,189,565 B2
(45) Date of Patent: Jan. 29, 2019

(54) MODULAR UNMANNED AERIAL SYSTEM WITH MULTI-MODE PROPULSION

(71) Applicant: THE UNITED STATES OF AMERICA, AS REPRESENTED BY THE ADMINISTRATOR OF NASA, Washington, DC (US)

(72) Inventors: Michael D. Patterson, Yorktown, VA (US); Jesse R. Quinlan, Yorktown, VA (US); William J. Fredericks, Williamsburg, VA (US)

(73) Assignee: THE UNITED STATES OF AMERICA AS REPRESENTED BY THE ADMINISTRATOR OF THE NATIONAL AERONAUTICS AND SPACE ADMINISTRATION, Washington, DC (US)

( * ) Notice: Subject to any disclaimer, the term of this patent is extended or adjusted under 35 U.S.C. 154(b) by 0 days.

(21) Appl. No.: 15/827,776

(22) Filed: Nov. 30, 2017

(65) Prior Publication Data

US 2018/0155021 A1 Jun. 7, 2018

Related U.S. Application Data

(60) Provisional application No. 62/429,091, filed on Dec. 2, 2016.

(51) Int. Cl.
*B64C 37/02* (2006.01)
*B64C 39/02* (2006.01)
(Continued)

(52) U.S. Cl.
CPC ............... *B64C 37/02* (2013.01); *B64C 3/00* (2013.01); *B64C 29/0033* (2013.01);
(Continued)

(58) Field of Classification Search
CPC ... B64C 39/024; B64C 3/00; B64C 2201/021; B64C 2201/102; B64C 2211/00;
(Continued)

(56) References Cited

U.S. PATENT DOCUMENTS 3,640,491 A * 2/1972 Harrison .................. B64C 1/00
 244/117 R
3,669,385 A * 6/1972 Glantz ...................... B64C 1/00
 244/13

(Continued)

FOREIGN PATENT DOCUMENTS

WO 2009/048666 A2 4/2009

OTHER PUBLICATIONS

Pogue, David, "Exclusive Amazon Reveals Details About Its Crazy Drone Delivery Program," https://www.yahoo.com/tech/exclusive-amazon-reveals-details-about-1343951725436982.html, Jan. 18, 2016, accessed Apr. 19, 2017.

(Continued)

*Primary Examiner* — Christopher P Ellis
(74) *Attorney, Agent, or Firm* — Andrea Z. Warmbier; Robin W. Edwards; Mark P. Dvorscak (57) ABSTRACT

A modular Unmanned Aerial System (UAS) includes an Unmanned Aerial Vehicle (UAV) parent module and UAV child modules. A main wing extends from a respective fuselage of the modules. The UAS includes docking mechanisms coupled to wingtips of the main wings. The child modules dock with the wingtips of the parent or an adjacent child module. Docking forms a linked-flight configuration, with undocking and separation from the parent or adjacent child module achieving an independent-flight configuration. The modules have booms arranged transverse to the main wings and parallel to the longitudinal axis, as well as front and rear rotors/propellers. The front and rear propellers have (Continued)

axes of rotation that are normal to a plane of the longitudinal axis in a vertical takeoff and landing (VTOL) configuration, with the axis of rotation of the rear propellers parallel to the longitudinal axis in a forward-flight configuration.

20 Claims, 5 Drawing Sheets

(51) Int. Cl.

| | | |
|---|---|---|
| *B64C 29/00* | (2006.01) | |
| *B64C 3/00* | (2006.01) | |
| *B64D 37/04* | (2006.01) | |
| *B64C 9/00* | (2006.01) | |

(52) U.S. Cl.
CPC .............. *B64C 39/024* (2013.01); *B64C 9/00* (2013.01); *B64C 2201/021* (2013.01); *B64C 2201/042* (2013.01); *B64C 2201/104* (2013.01); *B64C 2201/108* (2013.01); *B64C 2201/128* (2013.01); *B64C 2201/146* (2013.01); *B64C 2201/165* (2013.01); *B64C 2211/00* (2013.01); *B64D 37/04* (2013.01)

(58) Field of Classification Search
CPC ........ B64C 2201/126; B64C 2201/128; B64C 29/0033; B64C 2201/024; B64C 37/02
See application file for complete search history.

(56) References Cited

U.S. PATENT DOCUMENTS

| | | | | |
|---|---|---|---|---|
| 4,741,497 | A * | 5/1988 | Fox | B64C 39/12 244/117 R |
| 5,975,464 | A * | 11/1999 | Rutan | B64C 39/02 244/118.2 |
| 6,126,113 | A * | 10/2000 | Navickas | B64C 1/06 244/120 |
| 7,237,750 | B2 * | 7/2007 | Chiu | A45C 13/02 244/119 |
| 8,172,172 | B2 | 5/2012 | Gomez et al. | |
| 8,660,712 | B2 * | 2/2014 | Grabowsky | B64C 3/56 701/3 |
| 9,387,926 | B2 | 7/2016 | Sommer | |
| 9,475,579 | B2 | 10/2016 | Federicks et al. | |
| 9,505,484 | B1 * | 11/2016 | Al-Sabah | B64C 3/38 |
| 9,567,066 | B2 * | 2/2017 | Guida | B64C 23/076 |
| 9,714,087 | B2 * | 7/2017 | Matsuda | B64C 29/02 |
| 9,878,786 | B2 * | 1/2018 | Chan | B64C 39/024 |
| 2003/0141409 | A1 * | 7/2003 | Lisoski | B64C 3/42 244/13 |
| 2008/0149758 | A1 * | 6/2008 | Colgren | B64C 9/02 244/13 |
| 2009/0294573 | A1 | 12/2009 | Wilson et al. | |
| 2012/0083945 | A1 * | 4/2012 | Oakley | B64C 27/08 701/2 |
| 2014/0316616 | A1 * | 10/2014 | Kugelmass | G05D 1/101 701/8 |
| 2016/0011600 | A1 * | 1/2016 | Chubb | B64C 17/00 701/8 |
| 2016/0144969 | A1 * | 5/2016 | Rawdon | B64C 3/185 244/13 |
| 2016/0244160 | A1 * | 8/2016 | Colten | B64C 39/024 |
| 2016/0288903 | A1 | 10/2016 | Rothhaar et al. | |
| 2017/0001701 | A1 * | 1/2017 | Osvog | B64C 3/185 |
| 2017/0203839 | A1 * | 7/2017 | Giannini | B64D 29/02 |
| 2017/0233069 | A1 * | 8/2017 | Apkarian | B64F 5/10 244/7 R |
| 2017/0278410 | A1 * | 9/2017 | Byers | B64C 39/024 |
| 2017/0313421 | A1 * | 11/2017 | Gil | B64D 1/00 |
| 2018/0002026 | A1 * | 1/2018 | Oldroyd | B64C 11/46 |
| 2018/0072417 | A1 * | 3/2018 | Shannon | B64D 1/02 |
| 2018/0072422 | A1 * | 3/2018 | Shannon | B64D 1/22 |
| 2018/0086458 | A1 * | 3/2018 | Sartorius | B64C 39/024 |
| 2018/0155021 | A1 * | 6/2018 | Patterson | B64C 37/02 |
| 2018/0186448 | A1 * | 7/2018 | Pantalone | B64C 27/08 |

OTHER PUBLICATIONS

Lawler, Richard, "Google shows off 'Project Wing' delivery drones," https://www.engadget.com/2014/08/28/google-x-project-wing/ Aug. 28, 2014, accessed Apr. 19, 2017.
Burgess; "DHL's delivery drone can make drops quicker than a car," http://www.wired.co.uk/article/dhl-drone-delivery-germany, May 10, 2016, accessed Apr. 19, 2017.
Warwick, Graham, The Week in Technology, Sep. 12-18, 2016, Aviation Week and Space Technology.
Anderson, C. E. "Dangerous Experiments," Flight Journal, Dec. 2000, pp. 64-72.
Osborn, K., "Air Force's New Unmanned Strategy Has F-35 Pilots Flying Drones," Military.com webpage, May 19, 2015, http://www.military.com/daily-news/2015/05/19/air-forces-new-unmanned-strategy-has-f35-pilots-flying-drones.html. Accessed on Nov. 29, 2017.
Magill, Samantha A. et al., "Compound Aircraft Transport: A Comparison of the Wingtip-Docked and Close-Formation Flight," 41St AIAA Aerospace Sciences Meeting and Exhibit, Jan. 6-9, 2003, AIAA 2003-0607, pp. 1-17, Reno, NV.
Knaack, "Encyclopedia of the US Air Force Aircraft and Missile Systems," vol. 1Post-World War II Fighters 1945-1973, http://www.dtic.mil/docs/citations/ADA057002, accessed Apr. 19, 2017.
Moore, J.W. et al., "Multibody Transport Concept," AIAA 2nd International Very Large Vehicle Conference, May 17-18, 1982, AIAA 82-0810, Washington DC.
Tomazic, Tine et al., Pipistrel Taurus G4: on Creation and Evolution of the Winning Aeroplane of the NASA Green Flight Challenge 2011: Strojniski vestnik—Journal of Mechanical Engineering, 2011, vol. 57, No. 12, pp. 869-878.
Langelaan, Jack W. et al., "Green Flight Challenge: Aircraft Design and Flight Planning for Extreme Fuel Efficiency," Journal of Aircraft, May-Jun. 2013, vol. 50, No. 3, pp. 832-846.
Yaros, Steven F. et al., "Synergistic Airframe-Propulsion Interactions and Integrations: A White Paper Prepared by the 1996-1997 Langley Aeronautics Technical Committee." National Aeronautics and Space Administration, Mar. 1998, NASA/TM-1998-207644.
Jones, Gregory S. et al., "Research Opportunities in Advanced Aerospace Concepts," National Aeronautics and Space Administration, Dec. 2000, NASA/TM 2000-210547.
Montalvo, Carlos et al., "Meta Aircraft Flight Dynamics," Journal of Aircraft, Jan.-Feb. 2015, vol. 52, No. 1, pp. 107-115.
Montalvo, Carlos, "Meta Aircraft Flight Dynamics and Controls," Ph.D thesis, Georgia Institute of Technology, May 2014, pp. 1-161.
Duffy, Michael J. et al., "The LIFT! Project—Modular, Electric Vertical Lift System with Ground Power Tether," 33rd AIAA Applied Aerodynamics Conference, Jun. 22-26, 2015, AIAA Aviation, AIAA 2015-3013, Dallas TX.
U.S. Appl. No. 15/612,206, filed Jun. 2, 2017.
Park, Sanghyuk, "Avionics and Control System Development for Mid-Air Rendezvous of Two Unmanned Aerial Vehicles," Massachusetts Institute of Teohnology, Doctorate Dissertation, Feb. 2004, pp. 1-181.
Darren, Gray, "Drones to give firefighters and emergency workers an eye in the sky," Victoria News Webpage, Dec. 12, 2006, http://www.theage.com.au/victoria/drones-to-give-firefighters-and-emergency-workers-an-eye-in-the-sky-20161212-gt95sj.html. Accessed on Nov. 28, 2017.
Magill, Samantha A., "Compound Aircraft Transport Study: Wingtip-Docketing Compared to Formation Flight," Dissertation Paper, Virginia Polytechnic Institute and State University, 2002, pp. 1-20.

* cited by examiner

MODULAR UNMANNED AERIAL SYSTEM WITH MULTI-MODE PROPULSION

CROSS-REFERENCE TO RELATED PATENT APPLICATIONS

This patent application claims the benefit of and priority to U.S. Provisional Patent Application No. 62/429,091, filed on Dec. 2, 2016, the contents of which are hereby incorporated by reference in their entirety.

STATEMENT REGARDING FEDERALLY SPONSORED RESEARCH OR DEVELOPMENT

The invention described herein was made by employees of the United States Government and may be manufactured and used by or for the Government of the United States of America for governmental purposes without the payment of any royalties thereon or therefor.

BACKGROUND OF THE INVENTION

Unmanned Aerial Vehicle (UAV)-based services for commercial, private, and government applications have received heightened attention in recent years due largely to advancements in key supporting technologies. Corporate entities in particular continue to aggressively develop UAV-based delivery systems with the expectation that market demand for such services will include point-to-point/short-range and low-weight payload delivery. In addition to delivery services, possible UAV-based aerial applications include scientific data collection, search-and-rescue operations, surveillance and reconnaissance missions, and other applications requiring extended flight ranges and dwell times.

Such UAV flight missions tend to rely on single fixed-wing UAV configurations having a specified onboard sensor suite. Other proposed configurations use a multi-rotor design. While relatively lightweight, the use of fixed rotors may result in inefficient flight operations, reduced flying ranges, and/or lower payload-carrying capabilities. Therefore, a need exists for long-range UAV-based aerial delivery systems and methodologies to collectively provide a distributed aerial presence.

SUMMARY OF THE INVENTION

An Unmanned Aerial System (UAS) as described herein may be configured to provide the above-noted distributed aerial presence using one or more Unmanned Aerial Vehicle (UAV) modules as set forth herein. The UAS and/or the individual UAV modules of may deliver parcels or transport other payloads over an expanded flight range, or may optionally perform dedicated flight missions such as scientific data collection, search and rescue operations, or intelligence, reconnaissance and surveillance (ISR) missions. The present approach may involve the coordinated use of multiple UAV "child" modules that optionally dock or link to each other or to a UAV "parent" module, e.g., in a wingtip-to-wingtip manner. As a result, the effective flight range of the UAS may be expanded, with a possible sharing of energy taking place between linked modules during certain flight modes.

In general, the UAV modules are embodied as independently-operable electric and/or conventionally powered unmanned aircraft in the form of the UAV parent module and smaller but otherwise similarly configured UAV child modules, i.e., the UAV parent module has a larger fuselage and wing area relative to the UAV child modules. To ensure that the modules properly dock and maintain a high level of aerodynamic efficiency, the tip chord lengths of the wings of each module are the same. The parent and child modules operate together or independently depending on mission requirements and the particular stage of flight operations. When two or more child modules dock with the parent module, the resultant UAS resembles a fixed-wing aircraft having an extended main wing constructed from the interconnected main wings of the coupled UAV modules.

The UAV parent and child modules may include horizontal and/or vertical stabilizers, some of which may serve a dual purpose by functioning as landing gear structure. The parent module may be equipped to provide primary forward thrust when the UAS is in a linked-flight configuration. Upon reaching a rendezvous point, the child modules undock from the parent module, transition to independent flight, conduct an assigned flight mission, and then, if needed, return to and dock with the parent module and/or one another. Depending on the assigned flight mission, multiple child modules may remain docked or linked to one another and/or may undock at different times rather than all at once.

In a non-limiting example embodiment, a modular UAS is disclosed having a vertical takeoff and landing (VTOL) configuration and a forward-flight configuration. The UAS includes a plurality of Unmanned Aerial Vehicle (UAV) modules, each of which is configured to change between the VTOL and forward-flight configurations as needed, whether as a linked part of the UAS or as individually-flown modules. Each UAV module has a main wing coupled to a corresponding fuselage, a pair of booms extending orthogonally from the main wing, first and second pairs of rotors/propellers (fore and aft propellers, respectively), and a plurality of wingtip docking mechanisms. The propellers of the first pair are connected to one of main wings via a corresponding arm, such that the propellers are configured to pivot or articulate with respect to the main wing, and are stowed within a respective one of the booms when in the forward-flight configuration. The propellers of the second pair, which are connected to a respective one of the booms via a corresponding articulating motor mount, are tiltable with respect to the booms via the corresponding articulating motor mount.

The wingtip docking mechanisms are configured to selectively couple the UAV parent module and the UAV child modules to each other, wingtip-to-wingtip, in linked-flight configuration achievable in both the VTOL and forward-flight configurations, and to selectively uncouple the UAV parent module and the UAV child modules from each other in an independent flight configuration of the UAS. The first and second pairs of propellers rotate in parallel horizontal planes when in the VTOL configuration, while the second pair of propellers rotates in a vertical plane in the forward-flight configuration while the first pair of propellers remains stowed in the booms.

An optional fuel tank may be positioned within or connected to the fuselage of the parent module, with the parent module powered in such an embodiment using chemical energy from a supply of combustible fuel in the fuel tank. A main battery pack may be positioned within or connected to the fuselage of the parent module, in which case the propellers of the parent and child modules may be powered by electrical energy from the main battery pack when the UAS is in the linked-flight configuration.

The child modules may include a corresponding energy storage system, with the propellers of the child modules powered via energy from the corresponding energy storage system when the child modules are in the independent-flight configuration.

Radio frequency (RF) transceivers may be connected to the parent module and child modules. The parent and child modules in such an embodiment may remotely communicate with each other using the RF transceivers, e.g., during the independent-flight configuration.

The docking mechanisms at the wingtips of the parent and child modules may include a probe and a receptacle configured to engage with a corresponding receptacle and probe of an adjacent child module or the parent module. Alternatively, the docking mechanisms may include magnets serving a similar purpose.

The wings of the parent and child modules may include one or more vertically-oriented empennages, e.g., extending orthogonally from an underside of the wings toward the ground.

A method is also disclosed herein for controlling a modular UAS having VTOL and forward-flight configurations. The method includes docking wingtips of a UAV parent module to multiple UAV child modules via a plurality of wingtip docking mechanisms, with the parent and child modules having a corresponding fuselage and main wings extending orthogonally from a longitudinal axis of the fuselage. The method may include launching the UAS in the VTOL configuration, including powering a first pair of propellers (fore propellers) connected to a respective arm, with the first pair of propellers arranged forward of and transverse to the main wing, and powering a second pair of propellers aft of the wing (aft propellers). The fore and aft propellers have corresponding axes of rotation that are normal to a plane of the longitudinal axis when the UAS is in the VTOL configuration, i.e., the propellers rotate in the same horizontal plane or in parallel horizontal planes.

Additionally, the method includes transitioning the UAS to the forward-flight configuration at a predetermined altitude of the UAS, including articulating the first pair of propellers (fore propellers) via movement of the arms with respect to the main wings, stowing the first pair of propellers within a respective one of the booms, and tilting the second pair of propellers via the articulating motor mounts until the axis of rotation of the second pair of propellers is parallel to the longitudinal axis of the fuselage. Thereafter, the method includes flying the UAS to a rendezvous point in the forward-flight configuration, undocking some or all of the child modules from the parent module upon reaching the rendezvous point, and independently flying the parent and child modules in the forward-flight configuration to a corresponding destination using the rear propellers.

A UAV is also disclosed that has VTOL and forward-flight configurations. The UAV includes a fuselage having a longitudinal axis, a main wing connected to the fuselage and orthogonal to the longitudinal axis, first and second booms connected to and extending, e.g., orthogonally, from the main wing, and first and second pairs of propellers. The first pair of propellers (fore propellers) are connected proximate a leading edge of the main wing via a corresponding arm. The second pair of propellers (aft propellers) are positioned aft of a trailing edge of the main wing, with each aft propeller having an axis of rotation that is normal to a plane of the longitudinal axis of the fuselage when the UAV is in the VTOL configuration. The same axes of rotation are parallel to the longitudinal axis of the fuselage when the UAV is in the forward-flight configuration. The fore propellers are selectively stowed within a respective one of the first and second booms when the UAV is in the forward-flight configuration.

These and other features, advantages, and objects of the present disclosure will be further understood and readily apparent from the following detailed description of the embodiments and best modes for carrying out the disclosure by referring to the specification, claims, and appended drawings.

The present disclosure is amenable to various modifications and alternative forms, and some representative embodiments have been shown by way of example in the drawings and will be described in detail herein. It should be understood, however, that the novel aspects of this disclosure are not limited to the particular forms illustrated in the appended drawings. Rather, the disclosure is to cover all modifications, equivalents, combinations, groupings, and alternatives falling within the scope of this disclosure as defined by the appended claims.

DETAILED DESCRIPTION

Figure 1:
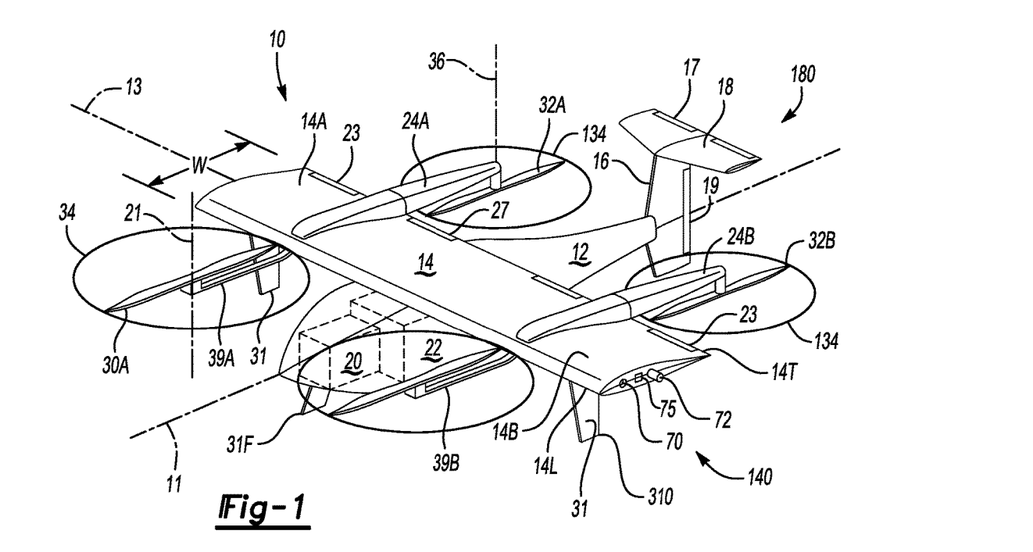
FIG. 1 is a schematic perspective view illustration of an Unmanned Aerial Vehicle (UAV) module in a vertical takeoff and landing (VTOL) flight configuration.

For purposes of description herein, the terms "upper," "above", "lower," "right," "left," "rear," "aft", "front," "fore", "vertical," "horizontal," and derivatives thereof shall relate to the invention as oriented in FIG. 1. However, various alternative orientations and step sequences are possible, except where expressly specified to the contrary. The specific devices and processes illustrated in the drawings and described in the following specification are intended as exemplary embodiments of the structure or processes as defined in the appended claims. Hence, specific dimensions and other physical characteristics relating to the representative embodiments disclosed herein are not limiting, unless the claims expressly state otherwise.

With reference to the drawings, wherein like reference numbers refer to the same or similar components throughout the several views, an Unmanned Aerial Vehicle (UAV) module 10 is depicted schematically in FIG. 1 in a vertical takeoff and landing (VTOL) flight configuration. The UAV module 10 may be used independently or as a linked part of an Unmanned Aerial System (UAS) 50 as described in detail below with reference to FIG. 6. The UAV module 10 has two primary flight modes: a linked-flight mode as depicted in FIG. 6 in which multiple similar UAV modules 10 are linked wingtip-to-wingtip via wingtip docking mechanisms, shown at 70 and 72, so as to form a single aircraft capable of flying in either of a forward-flight configuration or a VTOL configuration, and an unlinked/independent flight mode as depicted in FIGS. 1-5 in which each UAV module 10 is independently flown. Thus, the UAV modules 10 described herein are configured to fly in the VTOL or forward-flight configuration in both the linked-flight mode and the independent-flight mode.

The UAV modules 10 selectively dock with and undock from adjacent UAV modules 10 at different stages of a given flight mission, with a larger UAV module 10 in the form of a UAV "parent" module acting as a "mothership" in the linked mode shown in FIG. 6 by transporting two or more UAV child modules 10C (FIG. 6) to a predetermined rendezvous point while providing primary propulsion for the UAS 50. Use of the UAS 50, although optional, may facilitate a distributed aerial presence, e.g., for long-range delivery of parcels or other payloads, scientific data collection, surveillance and reconnaissance missions, or search and rescue operations.

The UAV module 10 of FIG. 1 may be configured as either the UAV parent module or the UAV child module. The parent module may have a larger transportation role in the linked-mode of operation, and therefore may be physically larger than the child modules to enable transport of larger or heavier cargo and/or fuel supplies as described below. Structurally, the parent and child modules may be substantially identical to each other, and therefore FIGS. 1-5 refer to the UAV module 10 generically without regard to its assigned parent or child role the linked mode configuration of FIG. 6.

The UAV module 10 shown in FIG. 1 includes a fuselage 12 containing a payload 20 and a power supply 22. The payload 20 may vary with the application, and may include a parcel in an example package delivery embodiment. Electro-optical or infrared cameras, laser or radar devices, temperature or pressure transducers, airspeed sensors, or other sensors required for a given mission may also be included as the payload 20 or in conjunction therewith. The power supply 22 may be a multi-cell battery pack, fuel cell stack, and/or a supply of aircraft fuel in different embodiments. An electric propulsion system may be used in some non-limiting embodiments of the UAV module 10, in which case the power supply 22 may take the form of a main battery pack or an additional battery pack located on or within the fuselage 12, with "main" and "additional" referring to relative size and/or power output. Hybrid electric architectures may also be used, for example with the UAV module 10 powered primarily or solely using chemical energy from a supply of fuel, or with fuel used in addition to stored or generated electricity.

Other power sources may be used, such as solar arrays (not shown), in order to provide the UAV module 10 with a suitable and reliable supply of energy for propulsion. Other possible payloads 20 include a radio frequency (RF) transceiver configured to broadcast corresponding flight control instructions to RF transceivers of other UAV modules 10. In this manner, a UAV module 10 configured as a UAV parent module is able to remotely communicate with UAV modules 10 configured as UAV child modules, particularly once the UAV child modules have transitioned to independent flight.

A main wing 14 of the UAV module 10 is affixed to the fuselage 12 and arranged orthogonally with respect to a longitudinal axis 11 of the fuselage 12. The main wing 14 may be considered as wing sections 14A and 14B having a constant wing chord length (W) with respect to a longitudinal wing axis 13. The wing chord length (W) is the same for all UAV modules 10 used in the UAS 50 of FIG. 6 to ensure proper docking and aerodynamic efficiency. In turn, the fuselage 12 is connected to a vertically-oriented empennage 180, e.g., a vertical stabilizer 16 having a rudder 19 and a horizontal stabilizer 18 having elevator flaps 17, with the horizontal stabilizer 18 mounted to the vertical stabilizer 16. Other flight control surfaces may include wing flaps 27 and ailerons 23, with the function and structure of the various flight control surfaces well known in the art. Vertical rudder assemblies 31 may be connected to the undersides of the wing sections 14A and 14B to provide additional flight control surfaces. Optionally, a lower surface 310 of the vertical rudder assemblies 31 may be configured as a respective landing surface, e.g., equipped with wheels, tracks, or skids (not shown).

The UAV module 10 of FIG. 1 includes first and second booms 24A and 24B connected to the main wing 14, i.e., extending orthogonally reward from a trailing edge 14T of the main wing 14 as shown. For propulsion, the UAV module 10 includes retractable or stowable first pair of propellers 30A and 30B, referred to hereinafter as front or fore propellers 30A and 30B, with axes of rotation 21. The front propellers 30A and 30B, the paths of rotation of which defines propeller sweep zones 34, are connected to a respective articulating arm 39A and 39B, e.g., via an articulating motor mount 25 (see FIG. 2) located proximate a leading edge 14L of the main wing 14 as shown schematically.

Additionally, a tiltable second pair of propellers 32A and 32B, hereinafter aft or rear propellers 32A and 32B, with paths of rotation defining respective sweep zones 134 are located aft of the trailing edge 14T of the main wing 14, with the rear propellers 32A and 32B having an axis of rotation 36. The axes of rotation 36 are normal to a plane of the longitudinal axis 11 of the fuselage 12 when the UAV module 10 is in a vertical takeoff and landing (VTOL) flight configuration as depicted. The arms 39A and 39B are pivotable and/or retractable into, and ultimately stowable within, a respective boom 24A or 24B on the main wing 14 when transitioning to and operating in the forward-flight configuration of FIG. 4.

Further with respect to the docking mechanisms introduced above, a probe 72 may be used in the form of a peg, extension, or other male fitting that is received within a mating receptacle 70, with each probe 72 configured to engage a corresponding receptacle 70 of an adjacent UAV module 10. As is well known in the art of airborne refueling, a universal drogue and probe-type fitting connection may be used to accommodate relative motion of two bodies in flight, here two of the UAV modules 10. Functionally or structurally similar fitting structure may be adapted for use as a docking mechanism. Or, the probe 72 and receptacle 70 may swap relative position on opposite edges of the UAV module 10, such that a given probe 72 is positioned to align with a corresponding receptacle 70 of an adjacent UAV module 10 and vice versa.

Figure 2:
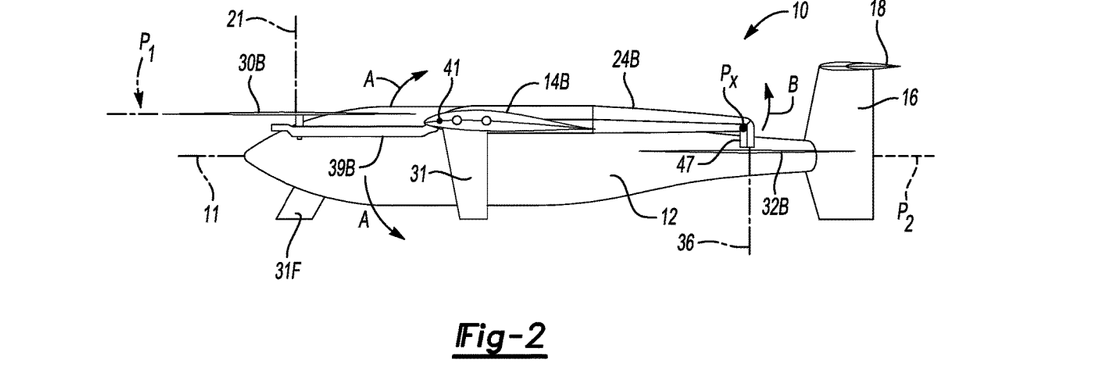
FIG. 2 is a schematic side view illustration of the UAV of FIG. 1 in the VTOL flight configuration.
Figure 3:
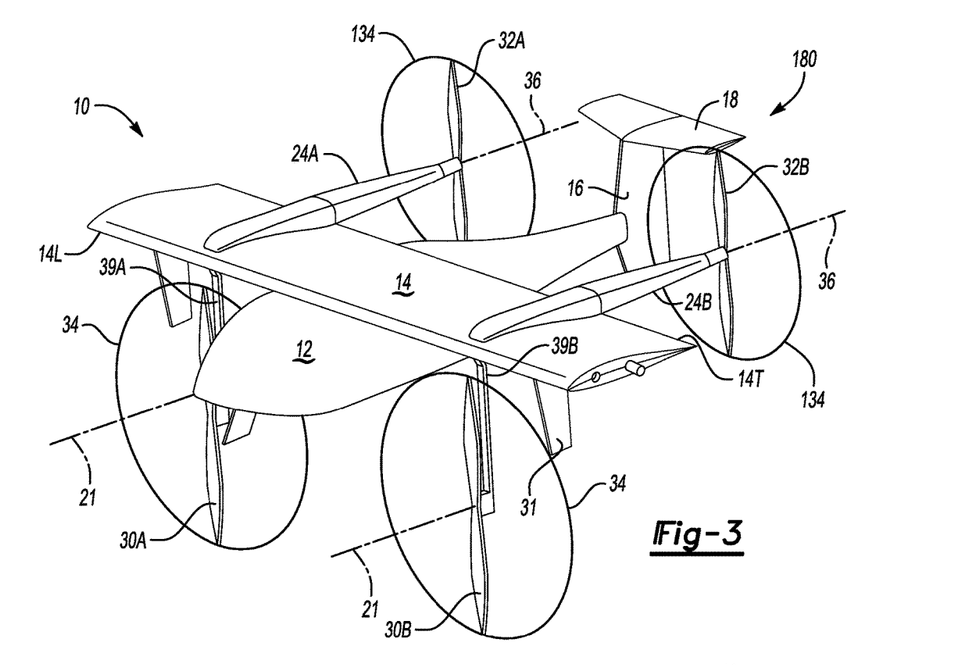
FIG. 3 is a schematic perspective view illustration of the UAV module of FIGS. 1 and 2 in a transitional configuration.

The docking mechanism may optionally include a set of magnets 75 configured to magnetically align adjacent UAV module 10, e.g., via mutual magnetic attraction with a corresponding field of an oppositely-polarized set of magnets 75. An electromagnet may be used and selectively controlled to alternatively generate and discontinue an electromagnetic field attraction for such a purpose. Alternatively, permanent magnets may be used in conjunction with an actuator device to apply a separation force and thereby urge adjacent UAV modules 10 away from each other. A solenoid, motor, shape memory element, rotary ball screw mechanism, or other suitable actuator may be used as the actuator device in different embodiments FIG. 2 depicts the UAV module 10 of FIG. 1 in side profile during a VTOL flight configuration. The rear propellers 32A and 32B articulate or pivot about a pivot axis Px that is parallel to the wing axis 13, with the rear propeller 32B being visible from the left-side perspective of FIG. 2. An articulating motor mount 47 connects the rear propeller 32B to the boom 24B as shown, such that upon transition to a forward-flight configuration the axis of rotation 36 is parallel to the axis 11 of the fuselage 12 as best shown in FIG. 3. As noted above, the arm 39B is ultimately stowed within the boom 24B when achieving the forward-flight configuration of FIG. 4. For example, the arm 39B may pivot with respect to the wing section 14B about a pivot axis 41, as indicated by arrow A, such that the front propeller 30B, when powered down, swings backward toward and into the boom 24B for stowage. To facilitate such an embodiment, the front and rear propellers 30B and 32B may rotate in different horizontal planes $P_1$ and $P_2$, respectively, when in the VTOL configuration of FIGS. 1 and 2.

Figure 4:
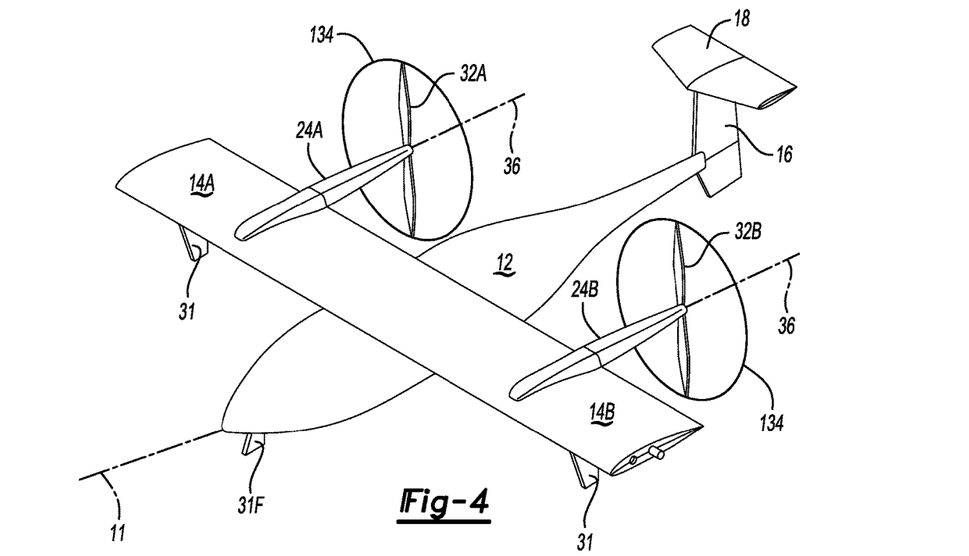
FIG. 4 is another schematic perspective view illustration of the UAV module of FIG. 1-3 in a forward-flight configuration.

As depicted in FIG. 3, transition from the VTOL configuration of FIGS. 1 and 2 to the forward-flight configuration of FIG. 4 commences with rotation of the rear propellers 32B of FIG. 2 about the pivot axis Px (FIG. 2) such that the axis of rotation 36 is parallel to the axis 11 of the fuselage 12. Thereafter, the front propellers 30A and 30B are powered off, locked to a respective one of the arms 39A and 39B, e.g., via a brake or locking device (not shown), and tilted, articulated, or otherwise pivoted rearward toward the booms 24A and 24B, with such pivoting indicated in FIG. 2 by arrow A. Optionally, the flight configuration of FIG. 3 may be maintained for certain forward-flight operations, such as with the front propellers 30A and 30B and the rear propellers 32A and 32B rotating in a plane that is orthogonal to a plane of the axis 11. In such a mode, the front propellers 30A and 30B positioned on a leading edge 14L of the main wing 14 pull the UAV module 10 forward through the air while the rear propellers 30A and 32B located aft of the trailing edge 14T push the UAV module 10 forward.

Figure 5:
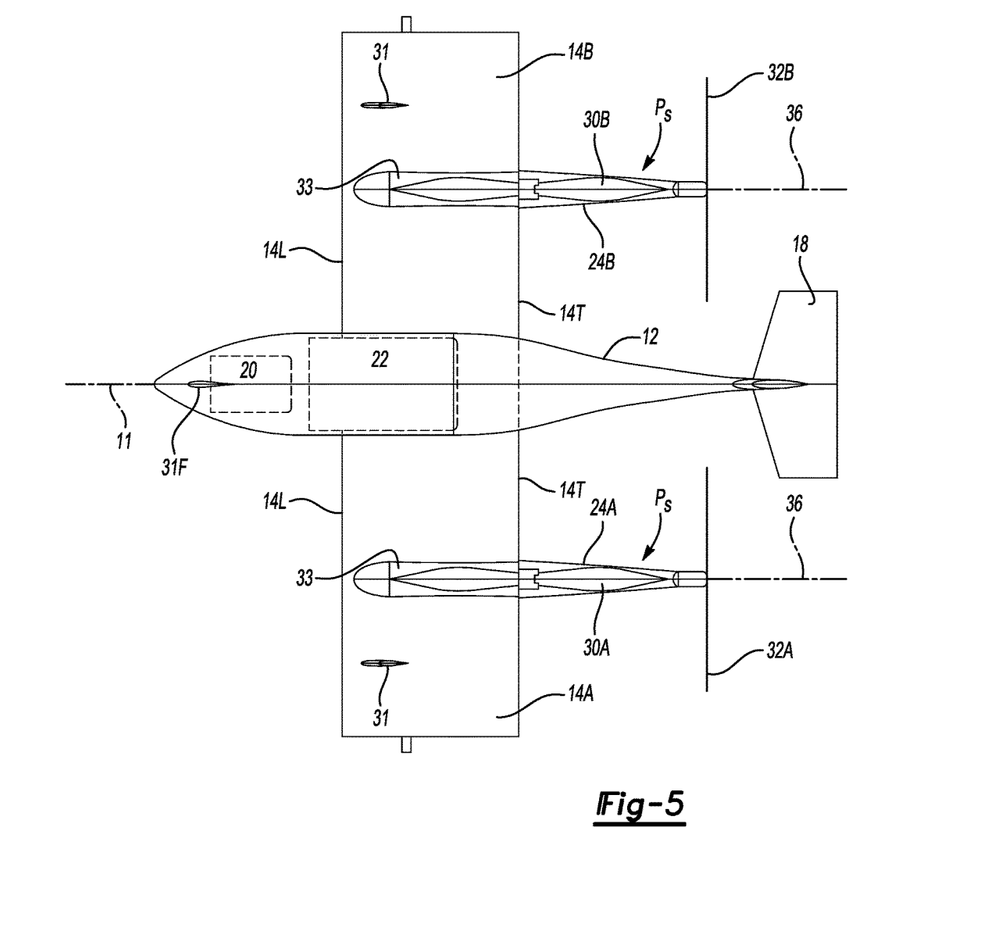
FIG. 5 is a schematic bottom view illustration of the UAV modules of FIGS. 1-4 in a forward-flight configuration.
Figure 6:
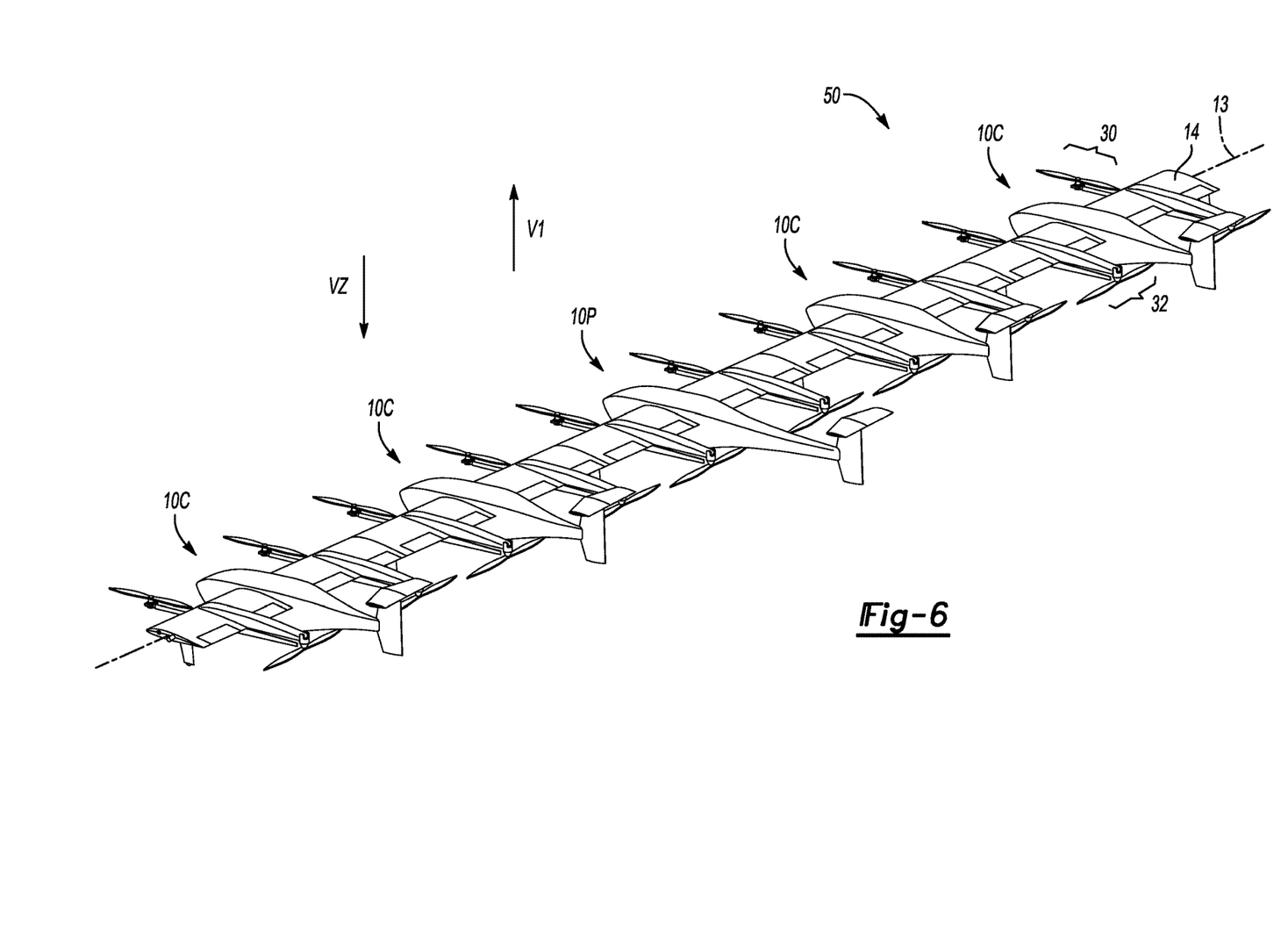
FIG. 6 is a schematic perspective view illustration of an Unmanned Aerial System (UAS) that includes a UAV parent module and multiple linked UAV child modules as set forth herein.

FIGS. 4 and 5 depict the UAV module 10 of FIGS. 1-3 upon achieving a forward-flight configuration in which the front propellers 30A and 30B are stowed within the respective booms 24A and 24B. The UAV module 10 is moved through the air solely using thrust from the rear propellers 32A and 32B. The perspective of FIG. 5 depicts the front propellers 30A and 30B as they would appear in a stowed position (arrows Ps) within the corresponding booms 24A and 24B. The booms 24A and 24B may include optional doors 33 configured to enclose the front propellers 30A and 30B when the UAV module 10 is in the forward-flight configuration, further reducing aerodynamic drag.

Figure 7:
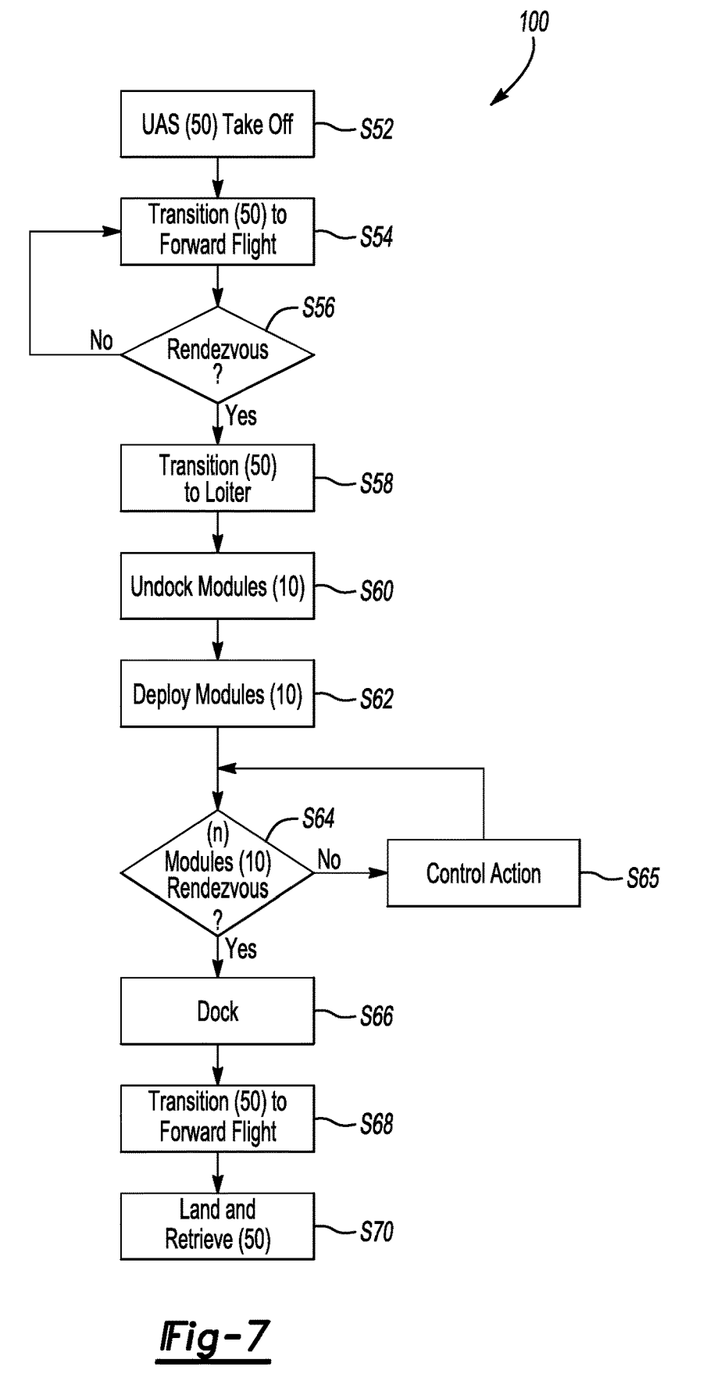
FIG. 7 is a flow chart describing an example method for operating the UAS and individual UAV modules of FIGS. 1-6 through the various flight stages.

An illustration of an example docked, forward-flight configuration of a UAS 50 is shown in FIGS. 6 and 7. A possible flight operation of the UAS 50 is described with reference to a method 100 as depicted in FIG. 7, with various control actions being commanded, controlled, and coordinated via onboard avionics controllers, which are omitted for simplicity commences at step S52 by initiating vertical takeoff as indicated in FIG. 6 by arrow V1 in FIG. 6. A UAV parent module 10P may be linked to multiple UAV child modules 10C in such a configuration. The respective front and rear propellers 30A, 30B and 32A, 32B of the UAV parent modules 10P may be powered alone or in conjunction with the front and rear propellers 30A, 30B and 32A, 32B of the child modules 10C during takeoff. For instance, if the parent module 10P includes a large supply of fuel and/or an oversized main battery pack, some or all of the child modules 10C may be powered off during takeoff to conserve energy. While three child modules 10C are shown linked on each end of the main wing 14 of the UAV parent module 10P in FIG. 6, more or fewer child modules 10C may be used in other embodiments. Alternatively, the parent module 10P and the child modules 10C may takeoff individually, i.e., without docking.

One vertical takeoff is complete, the UAS 50 transitions to forward-flight at step S54 and heads to a predetermined rendezvous point. Flight instructions may be broadcast or transmitted to the UAS 50 and received via an onboard RF transceiver as explained above. The UAS 50 may be provided with coordinates of a rendezvous point and heading by a ground-based control center (not shown), or the UAS 50 may be programmed with such information prior to takeoff.

Once the UAS 50 reaches the rendezvous point at step S58, the UAS 50 may transition to a "loiter" mode at step S60, which as used herein may entail flying the UAS 50 in an orbiting pattern or holding the UAS 50 in a stationary/hovering position. In other words, step S58 may entail executing a predetermined flight mode in preparation for deployment of the UAV child modules 10C. The UAV child modules 10C thereafter undock and deploy at steps S62 and S64. Implementation of steps S62 and S64 may vary depending on the configuration of the docking mechanism 45 of FIG. 1. For example, separation may include activation of the actuator device 55 shown schematically in FIG. 2 so as to urge a given child module 10C away from an adjacent child module 10C.

At step S64, a number (n) of the UAV child modules 10C fly under their own power to designated destinations to complete an assigned task, such as delivering the payload 60 of FIG. 1 in the form of a package to a particular address or destination, collecting scientific data, or performing a search-and-rescue operation. At step S64, the parent module 10P may determine whether all (n) child modules 10C have returned to the rendezvous point. The method may include proceeding to step S65 when fewer than (n) child modules 10C return to the rendezvous point, and to step S66 when all (n) child modules return.

Step S65 may include executing a control action when fewer than (n) UAV child modules 10C return to the rendezvous point. For instance, the parent module 30 may initiate a timer to count through an allowable amount of time, and/or transmit a maintenance status signal or recovery signal to any child modules 10C that have not returned in order to determine whether a given child module 10C is expected to return to the rendezvous point. The method 100 thereafter proceeds to step S66.

Step S66, which is executed just prior to docking of the UAV child modules 10C, includes determining whether the number (n) of child modules 10C deployed at step S64 and expected to return to the rendezvous point, e.g., using a previously assigned flight mission, a received maintenance status or signal, or other suitable information, have in fact returned. Assuming all (n) child modules 10C that deployed at step S64 are expected to return to the rendezvous point, step S65 may be repeated when fewer than (n) child modules 10C have returned, and to step S66 when all (n) child modules 10C have returned. In other embodiments, (n) may change from its value at step S64 when, whether due to maintenance, flight schedule, weather, or other circumstances, fewer than all of the deployed child modules 10C are expected to return to the rendezvous point.

At step S66, the parent module 10P commences docking operations with any of the UAV child modules 10C flying in proximity to the parent module 10P. Depending on mission requirements, docking may occur in hover mode or in forward flight. Thus, when docking occurs in hover mode, step S68 may include transitioning the UAS 50 to forward flight. Step S68 may include controlling the return flight of the UAS 50 to a desired landing destination, typically but not necessarily the original takeoff point of step S52. The method 100 then proceeds to step S70.

Step S70 includes commencing landing operations of the UAS 50 and thereafter retrieving the UAS 50. Step S70 may entail controlling the airspeed and altitude of the UAS 50 as the UAS 50 approaches the predetermined landing destination. Step S70 may further entail conventional runway landing when each UAV module 10 of the UAS 50 is in the configuration of FIG. 4. Alternatively, each UAV module 10 may transition to the VTOL configuration of FIGS. 1 and 2 by deploying the arms 39A and 29B from the booms 24A and 24B, rotating the deployed arms 39A and 29B opposite the direction of arrow B in FIG. 2, locking the arms 39A and 39B into place as shown in FIG. 1, and unlocking the front propellers 30A and 30B. At the same time, the rear propellers 32A and 32B are rotated or pivoted from the position of FIG. 3 to the position of FIGS. 1 and 2. The UAS 50 may thereafter descend vertically as indicated by arrow V2.

There may be advantages to using completely identical UAV modules 10C and forgoing use of a distinct parent module 10P. It may be possible to reduce acquisition and maintenance costs if by constructing the UAS 50 solely with identical vehicles, e.g., as a wing formed of identically sized and configured UAV modules 10. Similarly, if a shorter-range mission is required, the individual child modules 10C may be able to perform the mission without the need to link with and be transported by the parent module 10P. As a result, the modular approach disclosed herein provides a wide range of flexibility for achieving a distributed aerial presence.

The UAS 50 as described above therefore provides for the use of multiple UAV modules 10 each having a set of pusher propellers, i.e., the rear propellers 32A and 32B mounted on booms 24A and 24B extending aft of the main wing 14, e.g., via an articulating motor mount 47. These pusher propellers are controlled so as to tilt downward and provide direct powered lift for the UAV module 10 for vertical flight. The remainder of the lift required for such vertical flight is provided by front propellers 30A, 30B mounted on articulating arms 39A, 39B. In the forward-flight configuration, the arms 39A, 39B are stowed in the booms 24A, 24B holding the rear propellers 32A, 32B (pusher propellers) so as to reduce drag. For vertical flight, the same arms 39A, 39B are articulated approximately 180 degrees about a single pivot point 41 located near the leading edge 14L of the main wing 14 as shown in FIG. 2 so that the front propellers 30A, 30B are located ahead of the leading edge 14L of the main wing 14.

During a transition to horizontal flight, the arms 39A, 39B begin to rotate downward while the rear propellers 32A, 32B are controlled through an upward rotation. The rate at which the propellers 30A, 30B, 32A, and 32B rotate varies so that the UAV module 10 remains sufficiently stable and can begin moving forward. As airspeed increases, the power supplied to the front propellers 30A, 30B may be smoothly reduced to avoid potentially large nose-up pitching moments. Once sufficient airspeed is attained, the front propellers 30A, 30B are shut down and rotated up into the booms 24A, 24B, while the rear propellers 32A, 32B remain powered to provide the necessary propulsion of the UAV module 10, whether alone or as a linked part of the UAS 50 of FIG. 6.

The detailed description and the drawings or figures are supportive and descriptive of the disclosure, but the inventive scope is defined solely by the claims. While some of the best modes and other embodiments for carrying out the disclosure have been described in detail herein, various alternative designs and embodiments exist within the intended scope of this disclosure. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A modular Unmanned Aerial System (UAS) having a vertical takeoff and landing (VTOL) configuration and a forward-flight configuration, the UAS comprising:
    a plurality of Unmanned Aerial Vehicle (UAV) modules each having:
        a main wing coupled to a corresponding fuselage and having a uniform tip chord length across the plurality of UAV modules;
        a pair of booms extending orthogonally from the main wing;
        a first pair of propellers, each of which is connected to the main wing via a corresponding arm and selectively stowable within a respective one of the booms in the forward-flight configuration, the corresponding arm being configured to pivot with respect to the main wing;
        a second pair of propellers, each of which is connected to a respective one of the booms via a corresponding articulating motor mount and tiltable with respect to the booms via operation of the corresponding articulating motor mount, wherein the first and second pairs of propellers rotate in parallel horizontal planes in the VTOL configuration, and the second pair of propellers rotates in a vertical plane in the forward-flight configuration; and
        wingtip docking mechanisms;
    wherein the UAS is configured to selectively couple the UAV modules to each other, wingtip-to-wingtip, in both the VTOL and forward-flight configurations using the wingtip docking mechanisms, and is further configured to selectively uncouple the UAV modules from each other via the wingtip docking mechanisms in an independent flight configuration of the UAS.

2. The modular UAS of claim 1, wherein the plurality of UAV modules includes a single UAV parent module and a plurality of UAV child modules.

3. The modular UAS of claim 2, further comprising: a fuel tank positioned within or connected to a fuselage of the UAV parent module.

4. The modular UAS of claim 2, further comprising: a battery pack positioned within or connected to the fuselage of the UAV parent module, wherein the first and second pairs of propellers of the UAV parent module are powered by electrical energy from the battery pack.

5. The modular UAS of claim 4, further comprising a plurality of additional batteries each positioned within or connected to a respective one of the UAV child modules, wherein the first and second pairs of propellers of the UAV child modules are powered by electrical energy from a corresponding one of the additional batteries.

6. The modular UAS of claim 2, wherein each of the UAV modules includes a corresponding energy storage system, and wherein the first and second pairs of propellers of each of the UAV child modules are powered solely by energy from the corresponding energy storage system in the independent-flight configuration.

7. The modular UAS of claim 6, wherein the energy storage system is a battery pack, and wherein the energy is electrical energy.

8. The modular UAS of claim 1, further comprising: a plurality of radio frequency (RF) transceivers connected to a corresponding one of the plurality of UAV modules.

9. The modular UAS of claim 1, wherein the wingtip docking mechanisms include a probe and a receptacle.

10. The modular UAS of claim 1, wherein the wingtip docking mechanisms include a set of magnets.

11. The modular UAS of claim 1, wherein the main wing of each of the UAV modules includes at least one vertically-oriented rudder assembly.

12. A method for controlling a modular Unmanned Aerial System (UAS) having vertical takeoff and landing (VTOL) and forward-flight configurations, the method comprising:
docking an Unmanned Aerial Vehicle (UAV) parent module to a plurality of UAV child modules using a plurality of wingtip docking mechanisms to form the UAS, the UAV parent module and UAV child modules each having a corresponding fuselage with a longitudinal axis and main wing extending orthogonally from the corresponding fuselage;
launching the UAS in the VTOL configuration, including powering a first pair of propellers each connected to a respective boom and arranged forward of a respective one of the main wings, and a second pair of propellers positioned aft of a respective one of the main wings, wherein each propeller of the first and second pairs of propellers has a corresponding axis of rotation that is normal to a plane of the longitudinal axis when the UAS is in the VTOL configuration;
transitioning the UAS to the forward-flight configuration at a predetermined altitude of the UAS, including, for the UAV parent module and each of the UAV child modules, articulating the first pair of propellers with respect to a respective one of the main wings, stowing the first pair of propellers within a respective one of the booms, and tilting the second pair of propellers until the axes of rotation of the second pair of propellers are parallel to a longitudinal axis of the fuselage;
flying the UAS to a rendezvous point in the forward-flight configuration;
undocking some or all of the UAV child modules from the UAV parent module upon reaching the rendezvous point; and
independently flying the UAV parent module and the UAV child modules in the forward-flight configuration to a corresponding destination using the second pair of propellers.

13. The method of claim 12, further comprising: docking some or all of the UAV child modules with the UAV parent module or one of the UAV child modules upon completing a flight mission to and from the corresponding destinations.

14. The method of claim 12, wherein independently flying the UAV parent module and the UAV child modules includes delivering a payload to a corresponding destination.

15. The method of claim 12, wherein the UAV parent module and the UAV child modules include a corresponding radio frequency (RF) transceiver, the method further comprising: communicating with the UAV child modules via the UAV parent module using the RF transceivers.

16. The method of claim 12, wherein the docking includes inserting a probe of the UAV parent module into a mating receptacle of an adjacent one of the UAV child modules.

17. The method of claim 12, wherein the UAV parent module and each of the UAV child modules includes a corresponding vertically-oriented rudder assembly mounted to an underside of the main wing, the method further comprising: landing the UAS via the rudder assemblies in the VTOL configuration.

18. An Unmanned Aerial Vehicle (UAV) having vertical takeoff and landing (VTOL) and forward-flight configurations, the UAV comprising:
a fuselage having a longitudinal axis;
a main wing having first and second wing sections connected to the fuselage and orthogonal to the longitudinal axis;
first and second booms connected to and extending from the main wing;
a first pair of propellers connected proximate a leading edge of the main wing via a corresponding boom;
a second pair of propellers positioned aft of a trailing edge of the main wing, each propeller of the second pair of propellers having an axis of rotation that is normal to a plane of the longitudinal axis of the fuselage when the UAV is in the VTOL flight configuration, and that is parallel to the longitudinal axis when the UAV is in the forward-flight configuration;
wherein the propellers of the first pair of propellers are selectively stowable within a respective one of the first and second booms when the UAV is in the forward-flight configuration.

19. The UAV of claim 18, wherein the main wing defines wingtips, a corresponding docking mechanism is disposed with respect to each of the wingtips, and the UAV includes a plurality of UAVs each of which is configured to dock wingtip-to-wingtip to form an Unmanned Aerial System (UAS).

20. The UAV of claim 18, further comprising: at least one empennage connected to an underside of the main wing.

* * * * *